United States Patent
Rotter (10) Patent No.: US 6,684,846 B1
(45) Date of Patent: Feb. 3, 2004

(54) CRANKSHAFT OIL CIRCUIT

(75) Inventor: Terrence M. Rotter, Sheboygan Falls, WI (US)

(73) Assignee: Kohler Co., Kohler, WI (US)

( * ) Notice: Subject to any disclaimer, the term of this patent is extended or adjusted under 35 U.S.C. 154(b) by 0 days.

(21) Appl. No.: 10/198,787

(22) Filed: Jul. 18, 2002

(51) Int. Cl.$^7$ ................................................ F01M 1/00
(52) U.S. Cl. .............................. 123/196 R; 123/198 C
(58) Field of Search ...................... 123/196 R, 196 CP, 123/198 C (56) References Cited

U.S. PATENT DOCUMENTS

| | | | |
|---|---|---|---|
| 1,172,612 A | | 2/1916 | Kremer |
| 1,301,007 A | | 4/1919 | Roof |
| 1,410,019 A | | 3/1922 | Krause |
| 1,469,063 A | | 9/1923 | Wills |
| 1,590,073 A | | 6/1926 | Birkigt |
| 1,684,955 A | | 9/1928 | Goodwin |
| 2,235,160 A | | 3/1941 | Ljungstrom |
| 2,459,594 A | | 1/1949 | Smith |
| 3,118,433 A | | 1/1964 | Lechtenberg |
| 3,195,526 A | | 7/1965 | Jordan |
| 3,200,804 A | | 8/1965 | Hensler et al. |
| 3,314,408 A | | 4/1967 | Fenton |
| 3,407,741 A | | 10/1968 | Weber et al. |
| 3,457,804 A | | 7/1969 | Harkness |
| 3,561,416 A | | 2/1971 | Kiekhaefer |
| 3,751,080 A | | 8/1973 | Bailey et al. |
| 3,818,577 A | | 6/1974 | Bailey et al. |
| 3,949,725 A | * | 4/1976 | Jaulmes .................. 123/196 R |
| 4,030,179 A | | 6/1977 | Schwarz |
| 4,097,702 A | | 6/1978 | Halsted |
| 4,185,717 A | | 1/1980 | Ford, Jr. et al. |
| 4,198,879 A | | 4/1980 | Hornak et al. |
| 4,283,607 A | | 8/1981 | Brightman |
| 4,285,309 A | | 8/1981 | Johansson |

(List continued on next page.)

FOREIGN PATENT DOCUMENTS

| | | |
|---|---|---|
| DE | 3120190 A1 | 5/1982 |
| GB | 355365 | 8/1931 |
| GB | 378216 | 8/1932 |
| WO | WO 86/04122 A1 | 7/1986 |
| WO | WO 00/43655 A1 | 7/2000 |

OTHER PUBLICATIONS

"Technical Innovations–Briggs & Stratton extends engine life", SAE Off–Highway Engineering, Oct. 2001, p. 4.
3 undated photographs of Briggs & Stratton balance system, admitted prior art.

(List continued on next page.)

*Primary Examiner*—Tony M. Argenbright
*Assistant Examiner*—Katrina B. Harris
(74) *Attorney, Agent, or Firm*—Quarles & Brady LLP (57) ABSTRACT

A crankshaft, and method for distributing lubricant along a crankshaft, are disclosed. The crankshaft includes a crank pin, a crank arm, a main segment, and a flange. The crank arm is coupled between the main segment and the crank pin and has an outer side. A channel extends from within the crank pin to the outer side. The flange has outer and inner edges, is positioned on the main segment so that the outer edge abuts the main segment, and is further positioned so the inner edge abuts the outer side of the crank arm. The flange has first and second grooves along the outer and inner edges of the flange, respectively, and the grooves form a passage extending from the channel to an exterior portion of the main segment, so that lubricant can flow between the exterior portion of the main segment and the channel via the passage.

20 Claims, 6 Drawing Sheets

U.S. PATENT DOCUMENTS

| | | |
|---|---|---|
| 4,308,830 A | 1/1982 | Yamada et al. |
| 4,332,222 A | 6/1982 | Papez |
| 4,336,777 A | 6/1982 | Yanagihara et al. |
| 4,366,787 A | 1/1983 | Gale |
| 4,372,258 A | 2/1983 | Iwai |
| 4,380,216 A | 4/1983 | Kandler |
| 4,391,231 A | 7/1983 | TateBe et al. |
| 4,401,067 A | 8/1983 | Honda |
| 4,414,934 A | 11/1983 | Vogl et al. |
| 4,422,348 A | 12/1983 | Campbell |
| 4,433,651 A | 2/1984 | Nakakita et al. |
| 4,446,828 A | 5/1984 | Bauder et al. |
| 4,452,194 A | 6/1984 | Watanabe |
| 4,458,555 A | 7/1984 | Holtzberg et al. |
| 4,507,917 A | 4/1985 | Kandler |
| 4,510,897 A | 4/1985 | Hatz et al. |
| 4,530,318 A | 7/1985 | Semple |
| 4,534,241 A | 8/1985 | Remmerfelt et al. |
| 4,548,253 A | 10/1985 | Funatani et al. |
| 4,569,109 A | 2/1986 | Fetouh |
| 4,570,584 A | 2/1986 | Uetsuji et al. |
| 4,617,122 A | 10/1986 | Kruse et al. |
| 4,622,933 A | 11/1986 | Fukuo et al. |
| 4,644,912 A | 2/1987 | Umeha et al. |
| 4,656,981 A | 4/1987 | Murata et al. |
| 4,660,512 A | 4/1987 | Binder et al. |
| 4,672,930 A | 6/1987 | Sumi |
| 4,674,455 A | 6/1987 | Tsuboi |
| 4,684,267 A | 8/1987 | Fetouh |
| 4,688,446 A | 8/1987 | Ishikawa |
| 4,691,590 A | 9/1987 | Geringer et al. |
| 4,696,266 A | 9/1987 | Harada |
| 4,711,823 A | 12/1987 | Shiina |
| 4,736,717 A | 4/1988 | Fujikawa et al. |
| 4,793,297 A | 12/1988 | Fujii et al. |
| 4,802,269 A | 2/1989 | Mukai et al. |
| 4,819,592 A | 4/1989 | van Ligten |
| 4,819,593 A | 4/1989 | Bruener et al. |
| 4,822,414 A | 4/1989 | Yoshikawa et al. |
| 4,828,632 A | 5/1989 | Adam et al. |
| 4,834,784 A | 5/1989 | Bidanset |
| 4,836,045 A | 6/1989 | Lobig |
| 4,838,909 A | 6/1989 | Bidanset |
| 4,853,179 A | 8/1989 | Shiina |
| 4,867,806 A | 9/1989 | Shiina |
| 4,892,068 A | 1/1990 | Coughlin |
| 4,898,133 A | 2/1990 | Bader |
| 4,909,197 A | 3/1990 | Perr |
| 4,926,814 A | 5/1990 | Bonde |
| 4,928,550 A | 5/1990 | Sakai et al. |
| 4,934,442 A | 6/1990 | Futamura et al. |
| 4,949,687 A | 8/1990 | Emmersberger |
| 4,958,537 A | 9/1990 | Diehl et al. |
| 4,964,378 A | 10/1990 | Tamba et al. |
| 4,986,224 A | 1/1991 | Zuffi |
| 5,002,023 A | 3/1991 | Butterfield et al. |
| 5,038,727 A | 8/1991 | Burns et al. |
| 5,057,274 A | 10/1991 | Futamura et al. |
| 5,085,184 A | 2/1992 | Yamada et al. |
| 5,152,264 A | 10/1992 | Evans |
| 5,163,341 A | 11/1992 | Murrish et al. |
| 5,197,422 A | 3/1993 | Oleksy et al. |
| 5,197,425 A | 3/1993 | Santi |
| 5,207,120 A | 5/1993 | Arnold et al. |
| 5,241,873 A | 9/1993 | Hormann |
| 5,243,878 A | 9/1993 | Santi |
| 5,265,700 A | 11/1993 | Santi |
| 5,282,397 A | 2/1994 | Harkness et al. |
| 5,323,745 A | 6/1994 | Sato et al. |
| 5,357,917 A | 10/1994 | Everts |
| 5,370,093 A | 12/1994 | Hayes |
| 5,375,571 A | 12/1994 | Diehl et al. |
| 5,421,297 A | 6/1995 | Tamba et al. |
| 5,463,809 A | 11/1995 | Hoffman et al. |
| 5,497,735 A | 3/1996 | Kern et al. |
| 5,555,776 A | 9/1996 | Gazza |
| 5,556,441 A | 9/1996 | Courtwright et al. |
| 5,560,333 A | 10/1996 | Genouille |
| 5,615,586 A | 4/1997 | Phillips et al. |
| 5,651,336 A | 7/1997 | Rygiel et al. |
| 5,711,264 A | 1/1998 | Jezek et al. |
| 5,809,958 A | 9/1998 | Gracyalny |
| 5,823,153 A | 10/1998 | Santi et al. |
| 5,863,424 A | 1/1999 | Lee |
| 5,887,678 A | 3/1999 | Lavender |
| 5,904,124 A | 5/1999 | Poehlman et al. |
| 5,964,198 A | 10/1999 | Wu |
| 5,979,392 A | 11/1999 | Moorman et al. |
| 5,988,135 A | 11/1999 | Moorman et al. |
| 6,006,721 A | 12/1999 | Shannon et al. |
| 6,047,667 A | 4/2000 | Leppanen et al. |
| 6,047,678 A * | 4/2000 | Kurihara et al. ........ 123/196 R |
| 6,055,952 A | 5/2000 | Gau |
| 6,076,426 A | 6/2000 | Genouille |
| 6,109,230 A | 8/2000 | Watanabe et al. |
| 6,116,205 A | 9/2000 | Troxler et al. |
| 6,126,499 A | 10/2000 | Katayama et al. |
| 6,170,449 B1 | 1/2001 | Saiki et al. |
| 6,213,081 B1 | 4/2001 | Ryu et al. |
| 6,269,786 B1 | 8/2001 | Snyder et al. |
| 6,293,981 B1 | 9/2001 | Holderle et al. |
| 6,363,904 B1 * | 4/2002 | Kurihara et al. ........ 123/196 R |
| 6,395,049 B2 | 5/2002 | Knodler et al. |

OTHER PUBLICATIONS

Marketing literature concerning Briggs & Stratton AVS system. 2001 (2 pages).

Notes and photographs concerning Balance System of Briggs & Stratton shown at Louisville trade show in Jul. 2001 (3 pages of notes, 2 pages of photographs).

Information concerning gerators, obtained at www.viaenterprises.com, printed Mar. 2, 2002 (4 pages).

Information concerning crescent pumps, obtained at www.animatedsoftware.com, printed Jul. 2, 2001 (1 page).

"Gerotor Lubricating Oil Pump for IC Engines", S. Manco et al., SAE Intn'l FL98 (San Francisco) (17 pages).

Undated photographs of Kohler Command–Single Automatic Compression Release mechanism, admitted prior art (1 page).

Undated photographs of Briggs & Stratton Automatic Compression Release mechanism, admitted prior art (1 page).

Undated photographs of Honda OHC Automatic Compression Release mechanism and cam follower, admitted prior art (3 pages).

* cited by examiner

CRANKSHAFT OIL CIRCUIT

FIELD OF THE INVENTION

The present invention relates to internal combustion engines. In particular, the present invention relates to the lubrication of the crankshafts, and components associated with the crankshafts, of such engines.

BACKGROUND OF THE INVENTION

Internal combustion engines have numerous moving parts that require lubrication to make long-term operation of the engines possible. A variety of techniques and mechanisms are employed by different internal combustion engines to assure that the required lubrication is properly provided to each of these parts.

One part of an internal combustion engine that requires lubrication is the crankshaft. In particular, lubrication is required at the interface between a crank pin of a crankshaft and a corresponding connecting rod that couples the crank pin to a respective piston. Additionally, lubrication is required along the main segments of the crankshaft itself, so that the crankshaft can freely rotate at its bearings with respect to the crankcase.

Additionally, often in single-cylinder internal combustion engines, special counterweights are coupled to the crankshaft to balance the forces generated by the reciprocation of the piston, which can otherwise result in undesirable vibration of the engine. In some embodiments of these engines, the crankshaft includes flanges that support coupling arms that are coupled to the counterweights. More specifically, the coupling arms have circular orifices that are supported upon eccentric rims of the flanges, such that the center axes of the circular orifices are displaced by a certain amount from the actual central axis of the crankshaft. As the crankshaft rotates, the flanges also rotate, while the rotational orientation of the coupling arms does not significantly change. Consequently, the center axes of the circular orifices rotate around the central axis of the crankshaft, and the coupling arms and counterweights move toward and away from the crankshaft. To allow the eccentric rims to rotate relative to the coupling arms, lubrication is required therebetween.

In order for lubrication to proceed along the length of the crankshaft, and particularly for lubrication to proceed to and past the crank pin, some conventional crankshafts include an oil circuit that includes a "gun-drilled" channel from a main crankshaft bearing to the crank pin.

Such conventional embodiments are difficult to manufacture. In particular, the gun-drilling of the channel from the main bearing to the crank pin along the crankshaft is a technically difficult and costly operation. Moreover, because gun-drilling is employed to create the channel in the crankshaft, cost-savings associated with casting of the crankshaft parts cannot be fully realized.

It would therefore be advantageous if a new crankshaft oil circuit could be developed in which one or more lubrication channels were formed by a simpler, more standardized and less costly operation than gun-drilling. It would further be advantageous if crankshafts employing the new crankshaft oil circuit could be more easily manufactured through the use of standardized, casted parts.

SUMMARY OF THE INVENTION

The present inventors have discovered a new crankshaft oil circuit by which lubricant can be provided along a first main segment of the crankshaft, then to the crank pin, and further back onto the other main segment of the crankshaft. The crank pin of the crankshaft, which is supported relative to the main segments of the crankshaft by a pair of crank arms, has an internal channel or oil galley that can be simply casted as part of the crank pin. Additionally, two flanges are employed that, in certain embodiments, have eccentric rims used to support counterweights with respect to the crankshaft. The flanges are positioned onto the crankshaft so that inner edges of the flanges abut outer sides of the respective crank arms and also so that outer edges of the flanges abut the respective main segments of the crankshaft.

Each of the flanges has first and second grooves along the respective outer and inner edges of the flanges, respectively. The first grooves extend along the respective main segments of the crankshaft, while the second grooves extend radially outward from the first grooves along the respective crank arms. The second grooves of the respective flanges in particular extend to cover respective ends of the oil galley. Because of the grooves, passages are formed between the ends of the oil galley and exterior portions of the main segments of the crankshaft (beyond the flanges). Lubricant can be communicated via these passages between the main segments of the crankshaft and the crank pin. In certain embodiments, an additional channel exists between the oil galley and an exterior surface of the crank pin, such that lubricant can also be provided to an interface between the crank pin and a connecting rod. The use of the flanges with grooves and casted crank pin eliminates the need for gun-drilling of channels, and makes it possible to use simple, standardized, and less costly parts to create the crankshaft oil circuit.

In particular, the present invention relates to a crankshaft that includes a crank pin, a first crank arm, a first main segment, and a first flange. The first crank arm is coupled to the crank pin and has a first outer side, and a first channel extends from within the crank pin to the first outer side. The first main segment is coupled to the first crank arm. The first flange has a first outer edge and a first inner edge, and is positioned on the first main segment so that the first outer edge abuts the first main segment. The first flange is further positioned so the first inner edge abuts the first outer side of the first crank arm. The first flange has first and second grooves along the first outer and inner edges of the first flange, respectively, and the first and second grooves form a first passage extending from the first channel to a first exterior portion of the first main segment, so that lubricant can flow between the exterior portion of the first main segment and the first channel via the first passage.

The present invention further relates to an internal combustion engine that includes a crankcase, a cylinder coupled to the crankcase, a piston within the cylinder, and a crankshaft supported by a pair of bearings of the crankcase. The crankshaft includes first and second main segments, a crank pin to which the piston is coupled by a connecting rod, first and second crank arms that respectively couple the crank pin to the first and second main segments, and means for conducting lubricant. The means for conducting channels the lubricant at least between a first point along one of the first and second main segments and the crank pin.

The present invention additionally relates to a method of distributing lubricant along a crankshaft. The method includes providing the lubricant at a first end of the crankshaft, allowing the lubricant to flow along a first main segment of the crankshaft from the first end of the crankshaft to a first passage, and guiding the lubricant by way of the first passage to a first channel, where the first channel extends at least partly through a crank pin of the crankshaft. The first passage is formed between a first crank arm coupling the crank pin to the first main segment, and a first flange abutting the first crank arm.

DETAILED DESCRIPTION OF THE PREFERRED EMBODIMENT

Figure 1:
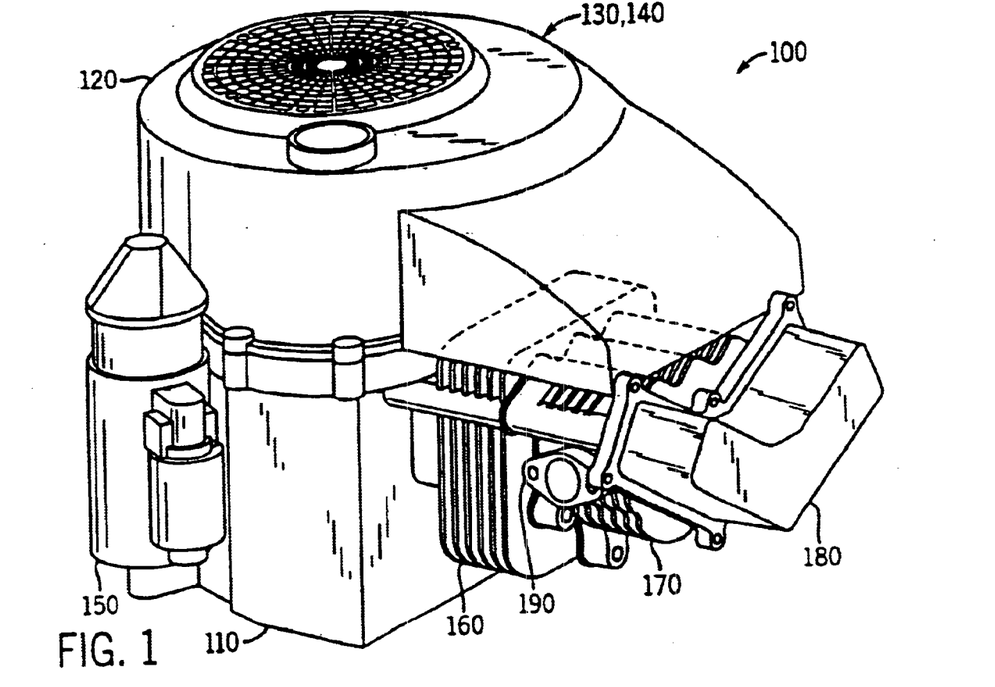
FIG. 1 is a first perspective view of a single cylinder engine, taken from a side of the engine on which are located a starter and cylinder head.
Figure 2:
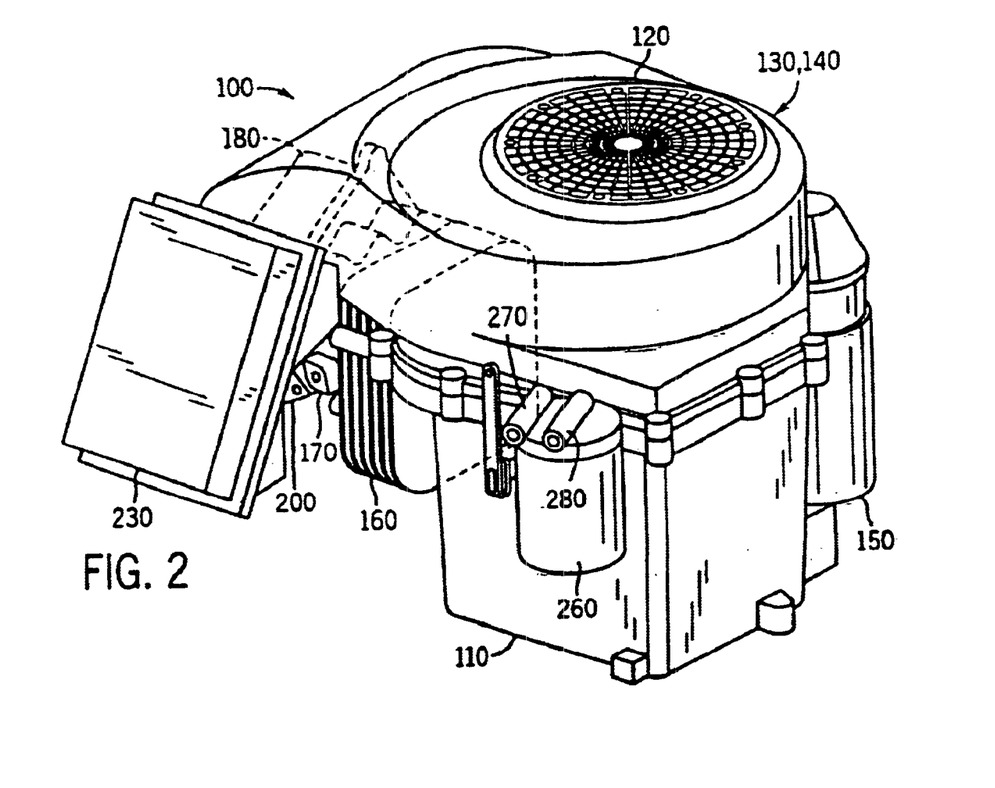
FIG. 2 is a second perspective view of the single cylinder engine of FIG. 1, taken from a side of the engine on which are located an air cleaner and oil filter.

Referring to FIGS. 1 and 2, a new single cylinder, 4-stroke, internal combustion engine 100 designed by Kohler Co. of Kohler, Wis. includes a crankcase 110 and a blower housing 120, inside of which are a fan 130 and a flywheel 140. The engine 100 further includes a starter 150, a cylinder 160, a cylinder head 170, and a rocker arm cover 180. Attached to the cylinder head 170 are an air exhaust port 190 shown in FIG. 1 and an air intake port 200 shown in FIG. 2. As is well known in the art, during operation of the engine 100, a piston 210 (see FIG. 7) moves back and forth within the cylinder 160 towards and away from the cylinder head 170. The movement of the piston 210 in turn causes rotation of a crankshaft 220 (see FIG. 7), as well as rotation of the fan 130 and the flywheel 140, which are coupled to the crankshaft. The rotation of the fan 130 cools the engine, and the rotation of the flywheel 140, causes a relatively constant rotational momentum to be maintained.

Referring specifically to FIG. 2, the engine 100 further includes an air filter 230 coupled to the air intake port 200, which filters the air required by the engine prior to the providing of the air to the cylinder head 170. The air provided to the air intake port 200 is communicated into the cylinder 160 by way of the cylinder head 170, and exits the engine by flowing from the cylinder through the cylinder head and then out of the air exhaust port 190. The inflow and outflow of air into and out of the cylinder 160 by way of the cylinder head 170 is governed by an input valve 240 and an output valve 250, respectively (see FIG. 8). Also as shown in FIG. 2, the engine 100 includes an oil filter 260 through which the oil of the engine 100 is passed and filtered. Specifically, the oil filter 260 is coupled to the crankcase 110 by way of incoming and outgoing lines 270, 280, respectively, whereby pressurized oil is provided into the oil filter and then is returned from the oil filter to the crankcase.

Figure 3:
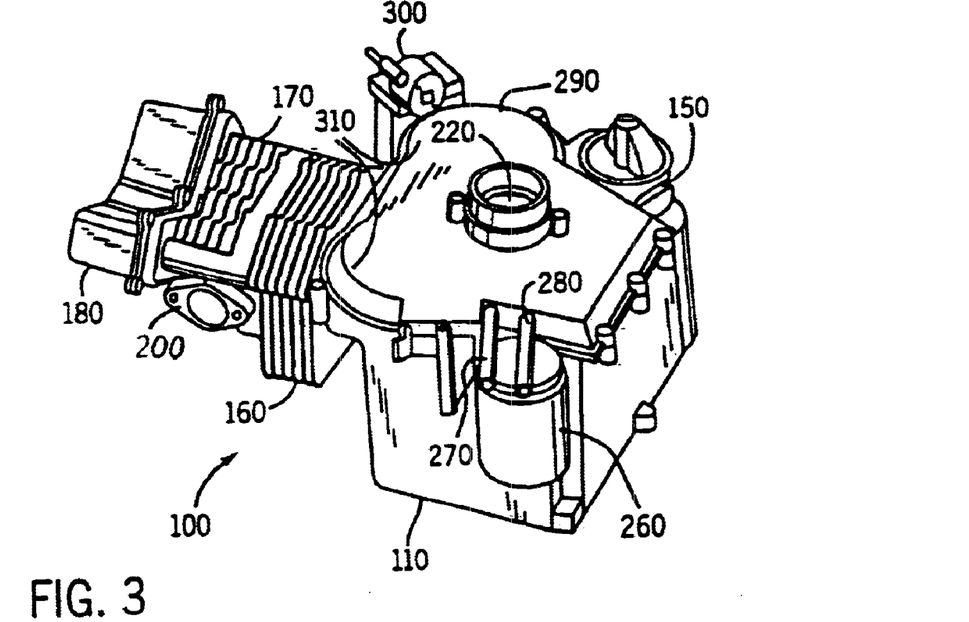
FIG. 3 is a third perspective view of the single cylinder engine of FIG. 1, in which certain parts of the engine have been removed to reveal additional internal parts of the engine.
Figure 4:
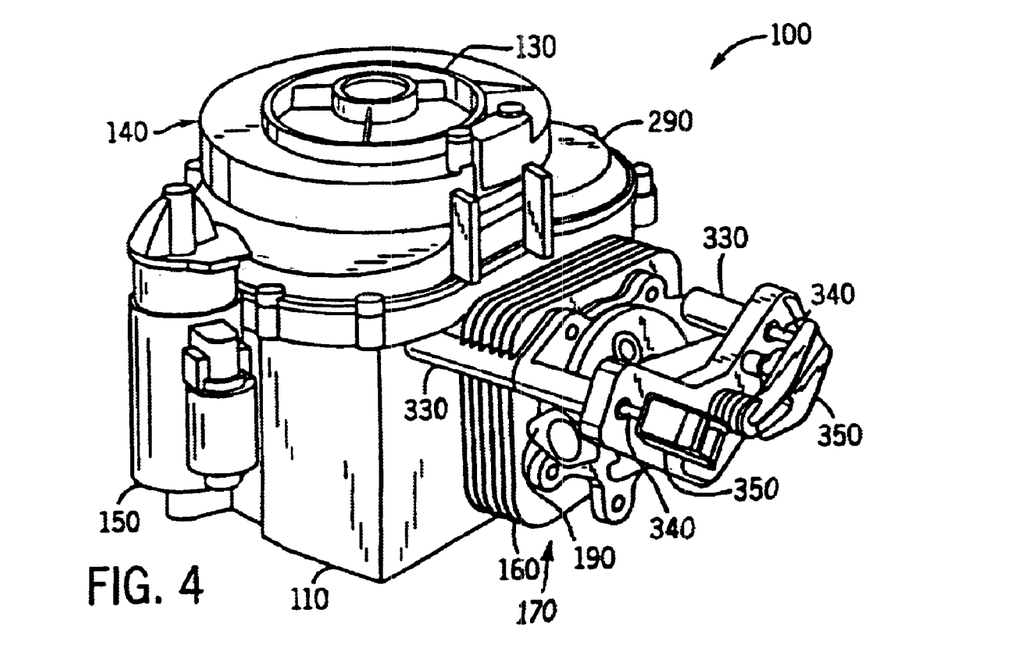
FIG. 4 is a fourth perspective view of the single cylinder engine of FIG. 1, in which certain parts of the engine have been removed to reveal additional internal parts of the engine.

Referring to FIGS. 3 and 4, the engine 100 is shown with the blower housing 120 removed to expose a top 290 of the crankcase 110. With respect to FIG. 3, in which both the fan 130 and the flywheel 140 are also removed, a coil 300 is shown that generates an electric current based upon rotation of the fan 130 and/or the flywheel 140, which together operate as a magneto. Additionally, the top 290 of the crankcase 110 is shown to have a pair of lobes 310 that cover a pair of gears 320 (see FIGS. 5 and 7–8). With respect to FIG. 4, the fan 130 and the flywheel 140 are shown above the top 290 of the crankcase 110. Additionally, FIG. 4 shows the engine 100 without the cylinder head 170 and without the rocker arm cover 180, to more clearly reveal a pair of tubes 330 through which extend a pair of respective push rods 340. The push rods 340 extend between a pair of respective rocker arms 350 and a pair of cams 360 (see FIG. 8) within the crankcase 110, as discussed further below.

Figure 5:
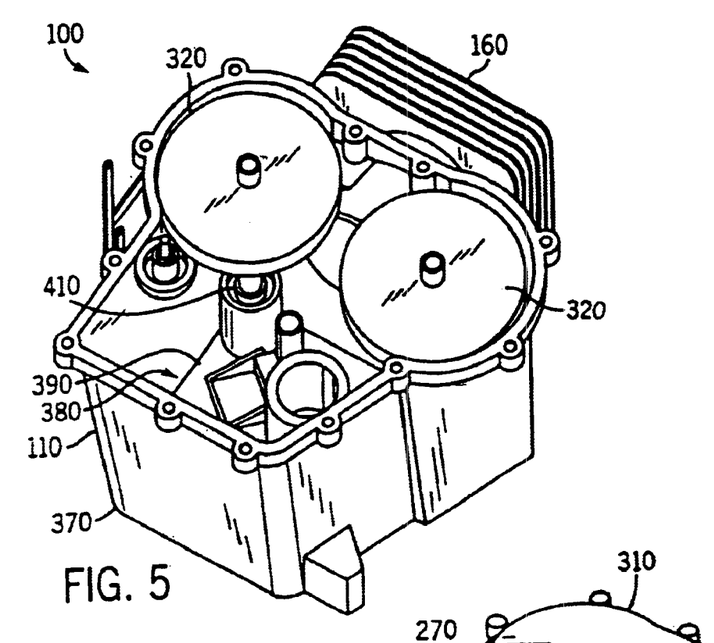
FIG. 5 is fifth perspective view of portions of the single cylinder engine of FIG. 1, in which a top of the crankcase has been removed to reveal an interior of the crankcase.
Figure 6:
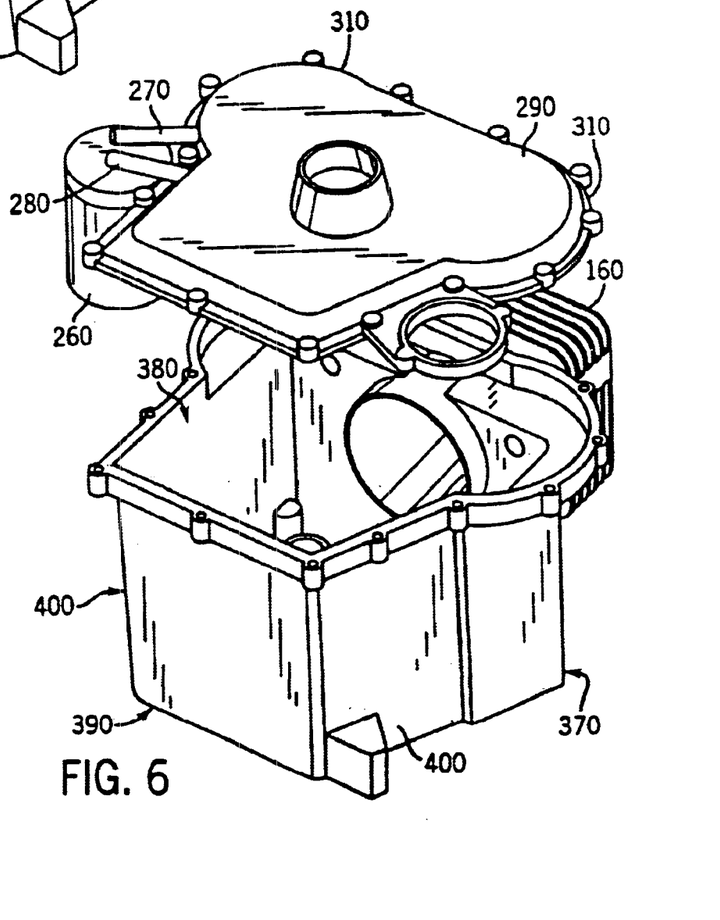
FIG. 6 is a sixth perspective view of portions of the single cylinder engine of FIG. 1, in which the top of the crankcase is shown exploded from the bottom of the crankcase.

Turning to FIGS. 5 and 6, the engine 100 is shown with the top 290 of the crankcase 110 removed from a bottom 370 of the crankcase 110 to reveal an interior 380 of the crankcase. Additionally in FIGS. 5 and 6, the engine 100 is shown in cut-away to exclude portions of the engine that extend beyond the cylinder 160 such as the cylinder head 170. With respect to FIG. 6, the top 290 of the crankcase 110 is shown above the bottom 370 of the crankcase in an exploded view. In this embodiment, the bottom 370 includes not only a floor 390 of the crankcase, but also all six side walls 400 of the crankcase, while the top 290 only acts as the roof of the crankcase. The top 290 and bottom 370 are manufactured as two separate pieces such that, in order to open the crankcase 110, one physically removes the top from the bottom. Also, as shown in FIG. 5, the pair of gears 320 within the crankcase 110 are supported by and rotate upon respective shafts 410, which in turn are supported by the bottom 370 of the crankcase 110.

Figure 7:
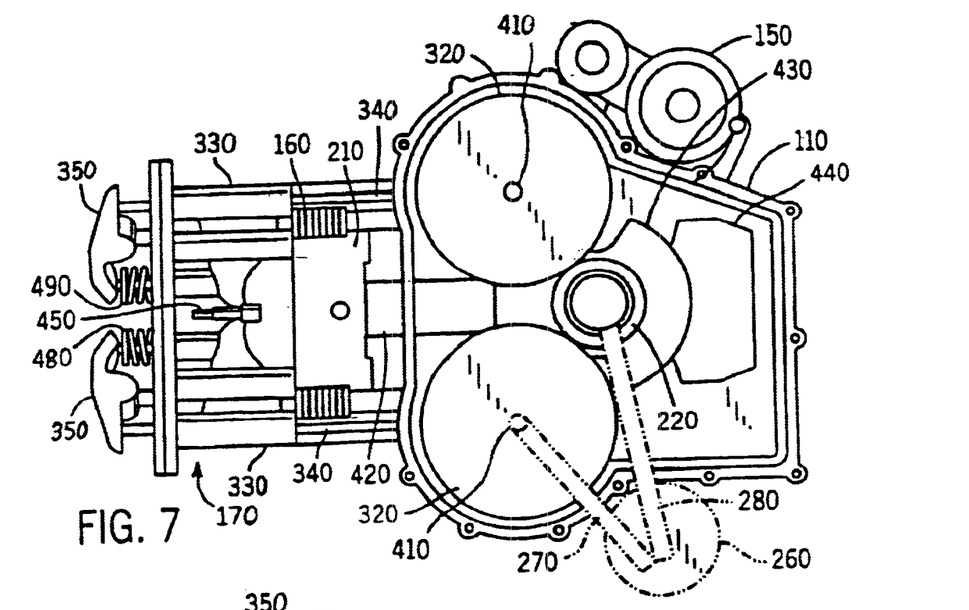
FIG. 7 is a top view of the single cylinder engine of FIG. 1, showing internal components of the engine in grayscale.

Referring to FIG. 7, a top view of the engine 100 is provided in which additional internal components of the engine are shown in grayscale. In particular, FIG. 7 shows the piston 210 within the cylinder 160 to be coupled to the crankshaft 220 by a connecting rod 420. The crankshaft 220 is in turn coupled to a rotating counterweight 430 and to a pair of reciprocal weights 440, which balance the forces exerted upon the crankshaft 220 by the piston 210. The crankshaft 220 further is in contact with each of the gears 320, and thus communicates rotational motion to the gears. In the present embodiment, the shafts 410 upon which the gears 320 are supported are capable of communicating oil from the floor 390 of the crankcase 110 (see FIG. 5) upward to the gears 320. The incoming line 270 to the oil filter 260 is coupled to one of the shafts 410 to receive oil, while the outgoing line 280 from the oil filter is coupled to the crankshaft 220 to provide lubrication thereto. FIG. 7 further shows a spark plug 450 located on the cylinder head 170, which provides sparks during power strokes of the engine to cause combustion to occur within the cylinder 160. The electrical energy for the spark plug 450 is provided by the coil 300 (see FIG. 3).

Figure 8:
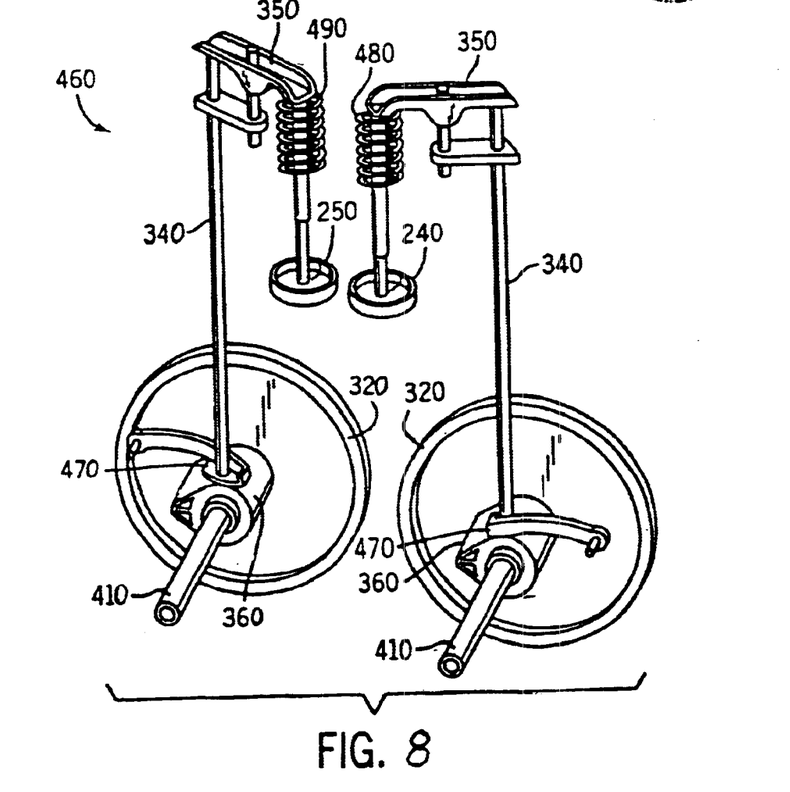
FIG. 8 is a perspective view of components of a valve train of the single cylinder engine of FIG. 1.

Further referring to FIG. 7, and additionally to FIG. 8, elements of a valve train 460 of the engine 100 are shown. The valve train 460 includes the gears 320 resting upon the shafts 410 and also includes the cams 360 underneath the gears, respectively. Additionally, respective cam follower arms 470 that are rotatably mounted to the crankcase 110 extend to rest upon the respective cams 360. The respective push rods 340 in turn rest upon the respective cam follower arms 470. As the cams 360 rotate, the push rods 340 are temporarily forced outward away from the crankcase 110 by the cam follower arms 470. This causes the rocker arms 350 to rock or rotate, and consequently causes the respective valves 240 and 250 to open toward the crankcase 110. As the cams 360 continue to rotate, however, the push rods 340 are allowed by the cam follower arms 470 to return inward to their original positions. A pair of springs 480,490 positioned between the cylinder head 170 and the rocker arms 350 provide force tending to rock the rocker arms in directions tending to close the valves 240, 250, respectively. Further as a result of this forcing action of the springs 480, 490 upon the rocker arms 350, the push rods 340 are forced back to their original positions.

In the present embodiment, the engine 100 is a vertical shaft engine capable of outputting 15–20 horsepower for implementation in a variety of consumer lawn and garden machinery such as lawn mowers. In alternate embodiments, the engine 100 can also be implemented as a horizontal shaft engine, be designed to output greater or lesser amounts of power, and/or be implemented in a variety of other types of machines, e.g., snow-blowers. Further, in alternate embodiments, the particular arrangement of parts within the engine 100 can vary from those shown and discussed above. For example, in one alternate embodiment, the cams 360 could be located above the gears 320 rather than underneath the gears.

Figure 9:
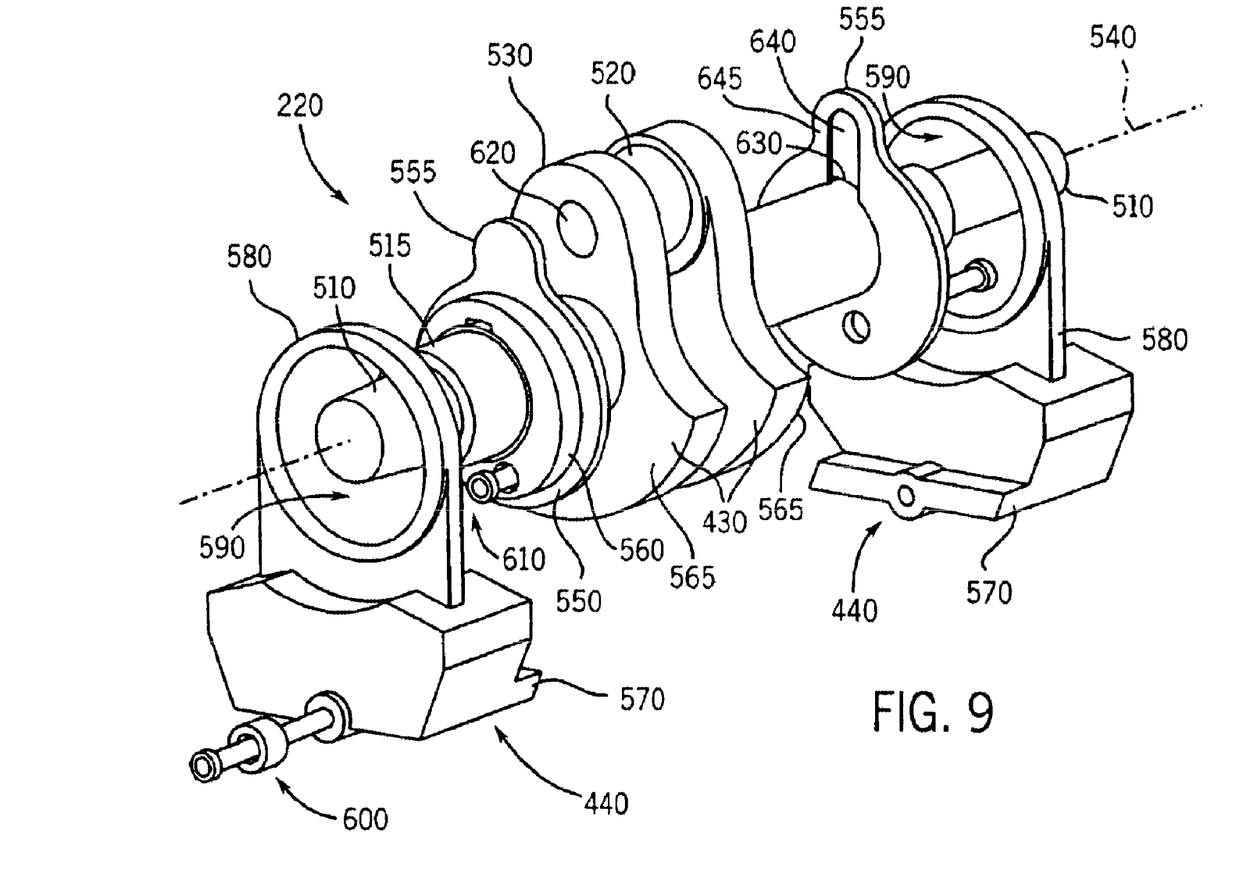
FIG. 9 is an exploded, perspective view of components associated with the crankshaft of the single cylinder engine of FIG. 1.
Figure 10:
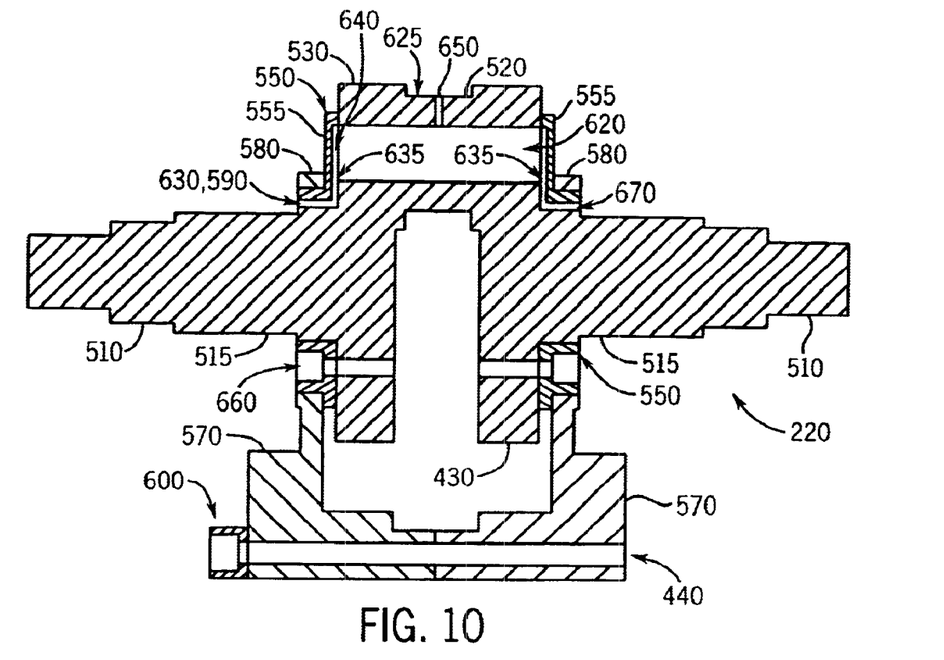
FIG. 10 is a cross-sectional view of components of the crankshaft taken along a central axis of the crankshaft.

Turning to FIGS. 9 and 10, components of the crankshaft 220 and the reciprocal weights 440 are shown in greater detail. FIG. 9 in particular provides an exploded, perspective view of the components of the crankshaft 220 and the reciprocal weights 440, while FIG. 10 provides a cross-sectional view of these components when fully assembled. As shown, the crankshaft 220 includes a pair of main segments 510, a crank pin 520, and a pair of crank arms 530 that respectively couple the crank pin to the respective main segments. When assembled within the engine 100, the connecting rod 420 connects the crank pin 520 to the piston 210 (see FIG. 7). The rotating counterweight 430 is formed by a pair of weights that are respective extensions of the respective crank arms 530, diametrically opposite from the crank pin 520 across a central axis 540 of the crankshaft 220. In alternate embodiments, the rotating counterweight 430 need not include two separate weights, and need not be integrally formed as part of the crank arms 530.

Further as shown in FIGS. 9 and 10, flanges 550 having eccentric rims 560 are respectively positioned onto the respective main segments 510. When fully assembled onto the crankshaft 220, the flanges 550 are respectively positioned so that respective inner edges 645 of the flanges abut respective outer sides 565 of the crank arms 530. In the present embodiment, the flanges 550 each include a respective protrusion 555 that extends radially outward away from the central axis 540. Specifically, the respective protrusions 555 extend alongside the respective outer sides 565 of the crank arms 530. Further, respective outer edges 665 (see FIG. 11) of the flanges 550 surround, and are supported by and in contact with (e.g., abut), the respective main segments 510. The pair of reciprocal weights 440, each of which has a flying brick portion 570 and a coupling arm 580 with a circular cavity 590, are also fit onto the crankshaft 220, such that the circular cavities 590 respectively fit around the eccentric rims 560. Due to the eccentric rims 560, the center axes of the circular cavities 590 (not shown) are displaced from the central axis 540. Consequently, when the crankshaft 220 rotates, the reciprocal weights 440 move toward and away from the crankshaft, and act as a balance of some of the forces of the reciprocating piston 210. The two reciprocal weights 440 are held together by a pin 600. Also, the flanges 550 are held against the crank arms 530 by way of an additional pin 610.

Further as shown, a crankshaft oil circuit is provided with respect to the crankshaft 220 to allow lubricant to flow along the entire length of the crankshaft unimpeded by the existence of the crank arms 530 and the crank pin 520, and also to provide lubrication of the interface between the crank pin 520 and the connecting rod 420. FIGS. 9 and 10 show that the crank pin 520 includes a channel or oil galley 620 through which lubricant is able to flow. The oil galley 620 can be simply formed within the crank pin 520 during casting of the crank pin. When supported by the crank arms 530, the crank pin 520 and its oil galley 620 extend the entire distance between the outer sides 565 of the crank arms. In alternate embodiments, the crank pin only extends up to the crank arms or partly through the crank arms rather than the entire distance between the outer sides 565. In such embodiments, the crank arms 530 additionally are formed with holes that extend the oil galley 620 to the outer sides 565 of the crank arms. Also, while the crank pin 520 is typically a part that is distinct from the respective crank arms 530, in certain embodiments the crank pin and one or both of the crank arms are integrally formed as a single part.

Figure 11:
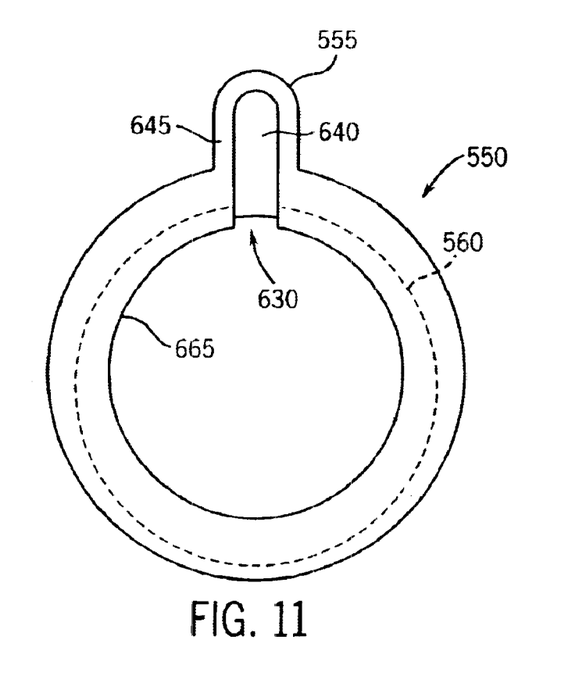
FIG. 11 is an elevation view of one of a pair of flanges that are part of the crankshaft.

Referring additionally to FIG. 11, which provides an elevation view of one of the flanges 550, each of the flanges includes a first groove 630 along the respective outer edge 665 of the flange, and also includes a second groove 640 along the respective inner edge 645 and the respective protrusion 555 of the flange. When the flanges 550 are positioned on the main segments 510 of the crankshaft 220 to abut the respective crank arms 530, the first grooves 630 extend in directions parallel to the central axis 540 from the respective inner edges 645 of the flanges to the ends of the flanges, e.g., to respective exterior portions 515 of the main segments 510. The second grooves 640 respectively extend radially outward from the respective outer edges 665 of the flanges 550, sufficiently far that the second grooves reach the corresponding open ends of the oil galley 620.

The first and second grooves 630, 640 of each flange 550 are coupled to one another at the location where the inner and outer edges 645, 665 of the flange meet. Consequently, when the respective flanges 550 are positioned onto the respective main segments 510, such that the outer edges 665 abut the main segments 510 and the inner edges 645 abut the outer sides 565 of the respective crank arms 530, respective passages 635 are formed by the respective sets of grooves 630, 640 (as shown best in FIG. 10). Lubricant such as oil 670 is therefore able to flow through the passages 635 between the exterior portions 515 of the main segments 510 and the oil galley 620. As shown in FIG. 10, in the present embodiment, an additional channel 650 connecting the oil galley 620 to the exterior of the crank pin 520 is also provided. The additional channel 650 allows oil to flow also between the oil galley 620 and an outer surface 625 of the crank pin 520, thereby allowing for lubrication of the interface between the crank pin and the connecting rod 420.

Although the engine 100 shown in FIGS. 1–8 is a vertical crankshaft engine, the crankshaft oil circuit described with respect to FIGS. 9–11 can be employed in its present or modified forms in a variety of engines having either vertical or horizontal crankshafts. With respect to horizontal crankshaft engines, the oil can flow through the crankshaft oil circuit because it is pumped, because of a slightly tipped orientation of the engine, or by way of other methods known in the art. Although pumping of the oil can also be employed with respect to vertical crankshaft engines, gravity alone is often sufficient to cause oil to flow downward along the upper one of the main segments 510 of the crankshaft 220, through the passage 635 formed by the first and second grooves 630, 640 of the higher of the two flanges 550, and into the oil galley 620. The pressure due to gravity further can be sufficient to cause the oil to then flow out of the oil galley 620 either through the additional channel 650 or out along the other of the main portions 510 of the crankshaft 220, by way of the passage 635 formed by the first and second grooves 630, 640 of the lower of the two flanges 550.

In alternate embodiments, the exact shapes of the flanges 550, the protrusions 555, and the first and second grooves 630, 640 can be modified from those shown in FIGS. 9–11. For example, the flanges 550 could have, in one alternate embodiment, a cross-sectional shape (viewed perpendicular to the central axis 540)that is identical to the outer sides 565 of the crank arms 530 to which the flanges are attached. Additionally, complementary grooves can be provided in the main segments 510 and/or the crank arms 530 to interface the first and second grooves 630, 640 or, in further embodiments, the grooves are entirely provided as indentations in the exterior surfaces of the main segments and the crank arms 530, while the inner and outer edges 645, 665 of the flanges 550 remain flat. In further alternate embodiments, the first and second grooves 630, 640 can be replaced with first and second channels that are fully enclosed within the flanges 550 or other components.

Also in certain alternate embodiments, lubrication is provided to the outer surface 625 forming the interface between the connecting rod 420 and the crank pin 520 in another manner, such that the additional channel 650 is not required. In further alternate embodiments, the oil galley 620 need not have a strictly cylindrical shape, nor need the oil galley extend fully between the two outer sides 565. For example, in certain embodiments, the purpose of the crankshaft oil circuit will be simply to allow lubricant to flow between the oil galley and one of the main segments 510, rather than to allow lubricant to flow from one main segment, past the crank pin and crank arms, to the other main segment.

Additionally, while in the present embodiment, the flanges 550 serve both the purpose of creating a crankshaft oil circuit and the purpose of supporting the reciprocal weights 440, in alternate embodiments, two distinct parts can be employed for these separate purposes. Further, crankshaft oil circuits such as the present embodiment can be employed in engines that are not single-cylinder engines, that is, engines that do not require reciprocal weights 440 and consequently do not require the flanges 550 to support the reciprocal weights. For example, in one alternate embodiment, the oil galley 620 would be coupled to the main segments 510 by passages 635 formed by flanges or other components positioned next to the crank arms 530, where these components did not have the eccentric rims 560. Also, such multi-cylinder engines could employ one or more crankshafts having one or more crank pins and sets of crank arms, all or any subset of which could employ passages/ channels/oil galleys as described above to form one or more oil circuits.

While the foregoing specification illustrates and describes the preferred embodiments of this invention, it is to be understood that the invention is not limited to the precise construction herein disclosed. The invention can be embodied in other specific forms without departing from the spirit or essential attributes of the invention. Accordingly, reference should be made to the following claims, rather than to the foregoing specification, as indicating the scope of the invention.

What is claimed is:

1. A crankshaft comprising:
   a crank pin;
   a first crank arm coupled to the crank pin and having a first outer side, wherein a first channel extends from within the crank pin to the first outer side;
   a first main segment coupled to the first crank arm; and
   a first flange having a first outer edge and a first inner edge, wherein the first flange is positioned on the first main segment so that the first outer edge abuts the first main segment, and wherein the first flange is further positioned so the first inner edge abuts the first outer side of the first crank arm,
   wherein the first flange has first and second grooves along the first outer and inner edges of the first flange, respectively, and wherein the first and second grooves form a first passage extending from the first channel to a first exterior portion of the first main segment, so that lubricant can flow between the exterior portion of the first main segment and the first channel via the first passage.

2. The crankshaft of claim 1, wherein the crank pin further includes a second channel coupling the first channel with an outer surface of the crank pin configured to support a connecting rod, so that the lubricant can flow between the first channel and the outer surface.

3. The crankshaft of claim 1, wherein the crank pin extends through the first crank arm to the first outer side of the first crank arm, and the first channel is formed entirely within the crank pin.

4. The crankshaft of claim 1, wherein the crank pin does not extend fully through the first crank arm to the first outer side of the first crank arm, wherein the first crank arm includes a hole that is aligned with and interfaces a second channel within the crank pin, wherein the hole begins at the first outer side of the first crank arm, and wherein the hole and the second channel form the first channel.

5. The crankshaft of claim 1, wherein the first flange is coupled to the first crank arm by a first pin.

6. The crankshaft of claim 1, wherein the second groove is formed within a first protrusion of the flange that extends radially alongside the first crank arm and covers an opening of the first channel, so that the second groove that forms part of the first passage is coupled to the first channel.

7. The crankshaft of claim 1, wherein the first flange has an eccentric rim configured to support a reciprocal weight having a coupling arm and a flying brick portion.

8. The crankshaft of claim 1, wherein the first crank arm includes a rotating counterweight portion that is diametrically opposed to a crank pin portion that supports the crank pin.

9. The crankshaft of claim 1, further comprising:
   a second crank arm coupled to the crank pin and having a second outer side, wherein the first channel extends from the first outer side to the second outer side;
   a second main segment coupled to the second crank arm; and a second flange having a second outer edge and a second inner edge, wherein the second flange is positioned on the second main segment so that the second outer edge abuts the second main portion, and wherein the second flange is further positioned so the second inner edge abuts the second outer side of the second crank arm, wherein the second flange has third and fourth grooves along the second outer and inner edges of the second flange, respectively, and wherein the third and fourth grooves form a second passage extending from the first channel to a second exterior portion of the second main segment.

10. The crankshaft of claim 9, wherein the lubricant is capable of flowing between the first and second exterior portions of the first and second main segments, respectively, by way of the first and second passages and the first channel.

11. The crankshaft of claim 10, wherein the crankshaft is vertically oriented and receives the lubricant at a top of the crankshaft, wherein the lubricant flows downward along the first main segment, enters the first passage from the first exterior portion of the first main segment, flows through the first passage to the first channel, flows through the first channel to the second passage, flows through the second passage to the second exterior portion of the second main segment, and flows downward along the second main segment.

12. The crankshaft of claim 11, wherein the lubricant is oil, wherein the lubricant flows along the crankshaft and through the first and second passages and the first channel due to a force of gravity, and wherein the lubricant additionally flows outward out of the crank pin by way of a second channel so that the oil is provided to an outer surface of the crank pin.

13. A crankshaft of claim 9, wherein the crankshaft is at least one of horizontally oriented, configured for operation in a single-cylinder engine, and configured for use in a multi-cylinder engine.

14. An internal combustion engine comprising:
a crankcase;
a cylinder coupled to the crankcase;
a piston within the cylinder; and
a crankshaft supported by a pair of bearings of the crankcase, wherein the crankshaft includes
first and second main segments,
a crank pin to which the piston is coupled by a connecting rod,
first and second crank arms that respectively couple the crank pin to the first and second main segments, and
means for conducting lubricant,
wherein the means for conducting channels the lubricant at least between a first point along one of the first and second main segments and the crank pin.

15. The internal combustion engine of claim 14, wherein the means for conducting channels the lubricant additionally between a second point along the other of the first and second main segments and the crank pin.

16. The internal combustion engine of claim 14, wherein the means for conducting channels the lubricant additionally through the crank pin and to an outer surface of the crank pin.

17. A method of distributing lubricant along a crankshaft, the method comprising:

providing the lubricant at a first end of the crankshaft;

allowing the lubricant to flow along a first main segment of the crankshaft from the first end of the crankshaft to a first passage;

guiding the lubricant by way of the first passage to a first channel, wherein the first channel extends at least partly through a crank pin of the crankshaft;

wherein the first passage is formed between a first crank arm coupling the crank pin to the first main segment, and a first flange abutting the first crank arm.

18. The method of claim 17, wherein the first passage is formed by first and second grooves along first outer and inner edges of the first flange, respectively, and wherein the first flange is positioned so the first inner edge abuts a first outer side of the first crank arm, and wherein the first flange is further positioned on the first main segment so that the first outer edge abuts the first main segment.

19. The method of claim 18, wherein the first flange has an eccentric rim that is configured to support a reciprocal weight having a coupling arm and a flying brick portion.

20. The method of claim 17, further comprising:

guiding a first amount of the lubricant from the first channel to a second passage;

guiding a second amount of the lubricant from the first channel through a second channel that conducts the second amount of the lubricant to an outer surface of the crank pin;

guiding the first amount of the lubricant through the second passage to a second main segment of the crankshaft;

allowing the first amount of the lubricant to flow along the second main segment of the crankshaft from the second passage to a second end of the crankshaft.

* * * * *